(12) United States Patent
Shi et al.

(10) Patent No.: US 6,985,509 B2
(45) Date of Patent: Jan. 10, 2006

(54) LOW COST DSSS COMMUNICATION SYSTEM

(75) Inventors: Qicai Shi, Coral Springs, FL (US); Robert J. O'Dea, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/378,236

(22) Filed: Mar. 3, 2003

(65) Prior Publication Data

US 2003/0152137 A1    Aug. 14, 2003

Related U.S. Application Data

(62) Division of application No. 10/036,554, filed on Dec. 21, 2001, now Pat. No. 6,563,857.

(51) Int. Cl.
*H04L 27/30* (2006.01)

(52) U.S. Cl. ............ 375/140; 375/145; 375/146; 370/514

(58) Field of Classification Search ............ 375/130, 375/140, 141, 145, 146; 370/320, 335, 342, 370/441, 479, 514, 515; 708/250, 252, 254, 708/255; 714/728, 739
See application file for complete search history.

(56) References Cited

U.S. PATENT DOCUMENTS

| | | | |
|---|---|---|---|
| 5,559,828 A | | 9/1996 | Armstrong et al. |
| 5,815,526 A | * | 9/1998 | Rice ............ 375/146 |
| 6,430,212 B1 | * | 8/2002 | Alisobhani et al. ........ 375/141 |
| 6,728,295 B1 | * | 4/2004 | Nallanathan et al. ....... 375/140 |

* cited by examiner

*Primary Examiner*—Dac V. Ha

(57) ABSTRACT

A method and apparatus for direct sequence spread spectrum communication having low complexity. In the transmitter, the data bit is spreaded by a code sequence, a reference code is interleaved with the code sequence, and together they are transmitted by the transmitter. The corresponding receiver recovers the data signal from the received signal by transforming the received signal to a complex base band signal and differentially decoding the base band signal at the chip level. The spreaded signal is despreaded by the chip-level differential operation, thus eliminating the decorrelation operation, and so significantly reducing the cost of the overall system. Furthermore, this system is very robust to any carrier frequency drift since the chip-level differential operation is used, thus releasing the reference clock or crystal requirements, and so further reducing the cost of the system.

10 Claims, 2 Drawing Sheets

LOW COST DSSS COMMUNICATION SYSTEM

This application is a Div. of application Ser. No. 10/036,554 filed on Dec. 21, 2001, now U.S. Pat. No. 6,563,857.

TECHNICAL FIELD

This invention relates to techniques and apparatus for wireless communication using Direct Sequence Spread Spectrum (DSSS) techniques.

BACKGROUND OF THE INVENTION

In the transmitter of a direct-sequence spread spectrum communication systems, a carrier waveform is modulated by a data sequence x(n) and by a spreading sequence or code sequence C(n). The code sequence may be a pseudo-noise (PN) sequence, such as a maximum length sequence (m-sequence). The PN sequence is used to reduce the sensitivity of the communication channel to noise, reduce the power spectral density of the signal and to allow multiple communication channels to operate simultaneously. In the latter case, each channel is assigned its own PN code sequence, so the technique is called code-division multiple access (CDMA).

In the receiver the data signal is recovered by removing the carrier wave and then correlating the received signal with the PN code sequence used for transmission. Decorrelation requires a large amount of computation to align the received signal with the PN code sequence, and so adds to the cost of the receiver.

In view of the preceding remarks, it is clear that there is an unmet need in the art for a receiver that avoids the high cost of performing a correlation between the received signal and a PN code sequence.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1A:
FIG. 1 is a diagrammatic representation of the generation of spreading codes in accordance with an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In direct sequence spread spectrum (DSSS) communication, a pseudo-noise (PN) code sequence is used to modulate a carrier waveform and thereby spread the spectrum of the transmitted signal. A PN code sequence of length N is denoted by $C=(C_1, C_2, C_3, \ldots, C_N)$, where $C_i$ has the value 1 or $-1$. The PN code sequence preferably has the property that the correlation of the sequence with a cyclically time-shifted version of itself has an absolute value of one or zero, whereas the correlation of the code sequence with itself has the value N.

In a first embodiment of the present invention, the two code sequences of length 2N are generated by interleaving groups of M elements from the sequences C and ±C. The two sequences are $$C_a(2jM+i)=C(jM+i) \quad C_a((2j+1)M+i)=C(jM+i)$$

and $$C_b(2jM+i)=C(jM+i) \quad C_b((2j+1)M+i)=-C(jM+i)$$

where $j=0, \ldots, N/M-1$ and $i=1, \ldots, M$.

Figure 1B:
Figure 2A:
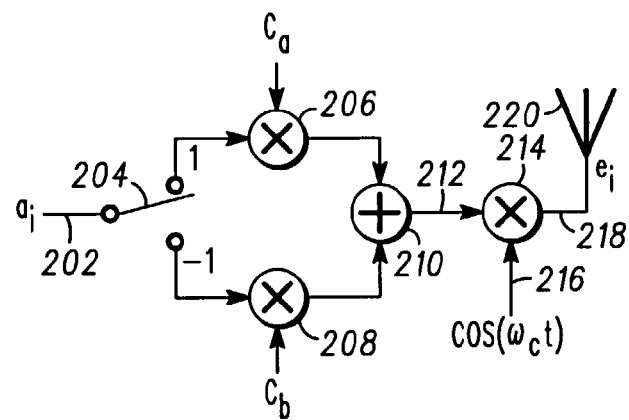
FIGS. 2A and 2B are diagrammatic representations of embodiments of a transmitter of the present invention.

For example, when M=1, the two code sequences of length 2N are generated as $C_a=(C_1, C_1, C_2, C_2, C_3, C_3, \ldots, C_N, C_N)$ and $C_b=(C_1, -C_1, C_2, -C_2, C_3, -C_3, \ldots, C_N, -C_N)$. These sequences may be generated, as in FIG. 1 for example, by interleaving the code sequence C with the code sequence C or $-C$. The transmitted signal is generated as shown in FIG. 2A. The data signal $x=(a_1, a_2, a_3, \ldots)$ 202 is passed to selector 204. If the current signal $a_i$ is equal to 1 it is passed to multiplier 206, where it is multiplied by the code sequence $C_a$. If the current signal $a_i$ is equal to $-1$ it is passed to multiplier 208, where it is multiplied by the code sequence $C_b$. The outputs from the multipliers 206 and 208 are added at summer 210, to produce a modulation signal 212. The modulation signal 212 is passed to multiplier 214, where it multiplies (modulates) the carrier signal $\cos(\omega_c t)$ 216. Here, $\omega_c$ is the carrier frequency in radians per second, and t is the time in seconds. The resulting signal 218 is amplified and passed to antenna 220 for transmission. One element (chip) of the code sequence is generated every $T_c$ seconds, so the chip rate is $R_c=1/T_c$. The bit-rate is equal to $R_c/(2N)$, since 2N chips are used for each bit of information.

Figure 2B:
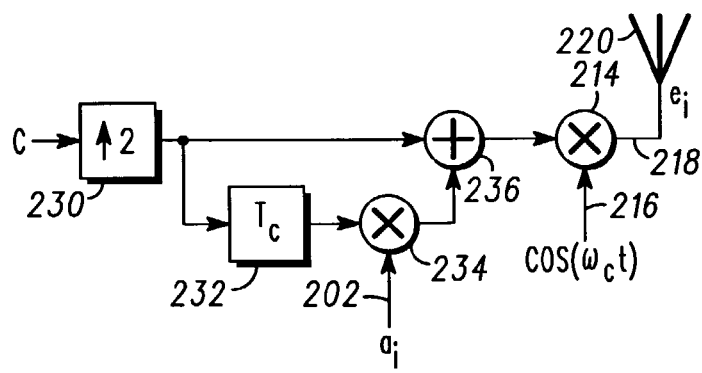

FIG. 2B shows a further transmitter of the present invention. A PN code sequence $C=(C_1, C_2, C_3, \ldots, C_N)$ is supplied to interpolator or up-sampler 230, that inserts zeros between the elements of the code sequence, yielding the sequence $C_{int}=(C_1, 0, C_2, 0, C_3, 0, \ldots, 0, C_N, 0)$. The sequence is delayed by one chip period in delay element 232 to give the sequence $(0, C_1, 0, C_2, 0, C_3, 0, \ldots, 0, C_N)$. The delayed signal is multiplied by the data value $a_i$ at 234 and the result is added at 236 to the interpolated sequence to give the sequence $(C_1, a_i C_1, C_2, a_i C_2, C_3, a_i C_3, \ldots, C_N, a_i C_N)$. The gives the sequence $C_a$ when $a_i=1$, and the sequence $C_b$ when $a_i=-1$. The sequence is then modulated by the carrier signal and transmitted as usual.

Figure 3:
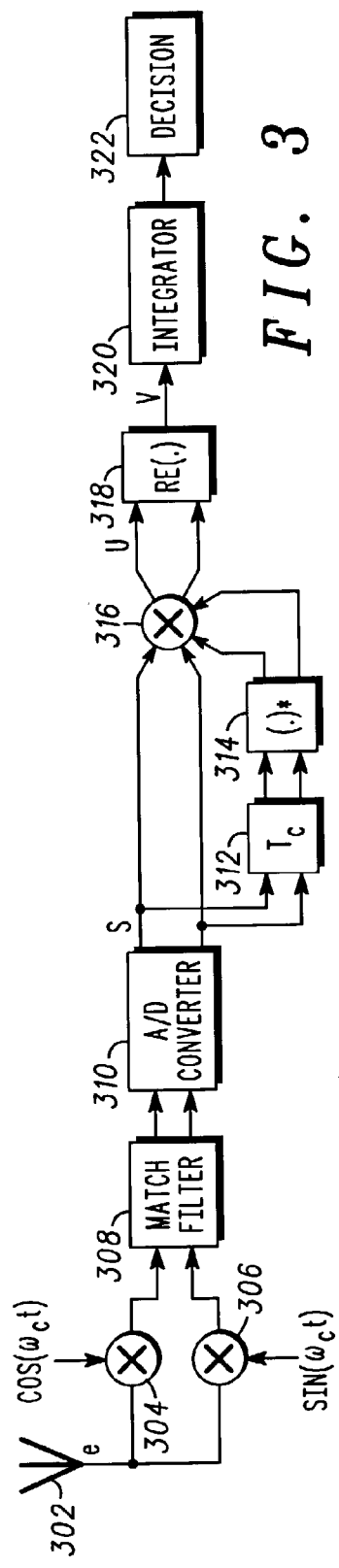
FIG. 3 is a diagrammatic representation of a digital receiver of the present invention.

The corresponding receiver is shown in FIG. 3. Referring to FIG. 3, the incoming radio signal is received by antenna 302. The received signal is multiplied by the signal $\cos(\omega_c t)$ in multiplier 304 to produce an in-phase signal component. The received signal is multiplied by the signal $\sin(\omega_c t)$ in multiplier 306 to produce a quadrature signal component. The in-phase and quadrature signal components are filtered in match filter 308, which has an impulse response matched to the transmitted pulse shape, and the resulting filtered signals are sampled by analog-to-digital converter (ADC) 310 to produce in-phase and quadrature data sequences I and Q. The sampling rate of the ADC is preferably greater than the chip rate, and is denoted by $K.R_c$, where K is bigger than or equal to 1. The $n^{th}$ samples of the sequences are denoted by the complex baseband signal $S(n)=I(n)+iQ(n)=A(n)e^{-i\theta}$, where $i=\sqrt{-1}$ and $\theta$ is an unknown phase offset. The complex baseband signal S(n) is passed to complex delay unit 312, where the signal is delayed by an amount $MT_c$, where $T_c$ is the chip period and M is the number of consecutive samples taken from each sequence during interleaving in the transmitter. The output from the complex delay unit is S(n−MK). In the sequel we consider the case M=1 without loss of generality. The complex conjugate of the signal is calculated at 314, to give the signal $$S^*(n-k)=I(n-K)-iQ(n-K)=A(n-K).e^{i\theta}.$$

At multiplier 316, the signals S(n) and S*(n−K) are multiplied to give the complex product signal $$U(n)=A(n)e^{-i\theta}.A(n-K)e^{i\theta}=A(n).A(n-K).$$

At block 318, the real part is taken to give V(n)=A(n)A(n−K). This removes any imaginary part introduced by a small mismatch between the carrier frequency in the transmitter and the receiver. The signal V(n) is then integrated at 320 and the result passed to decision logic 322.

By way of explanation, we consider the case K=1. When a bit 1 is transmitted, the current data value is $a_i=1$, the previous data value is $a_{i-1}$. The received signal is $I=C_a=(C_1, C_1, C_2, C_2, C_3, C_3, \ldots, C_N, C_N)$, the delayed version of I is $I'=(a_{i-1}C_N, C_1, C_1, C_2, C_2, C_3, C_3, \ldots, C_{N-1}, C_N)$, and the product of I with I' is $$V = (a_{i-1}C_NC_1, C_1C_1, C_1C_2, C_2C_2, C_2C_3, C_3C_3, C_3C_4, \ldots,$$
$$C_{N-1}C_{N-1}, C_{N-1}C_N, C_NC_N)$$
$$= (a_{i-1}C_NC_1, 1, C_1C_2, 1, C_2C_3, 1, C_3C_4, \ldots, 1, C_{N-1}C_N, 1).$$

The integration over one cycle gives $$N+a_{i-1}C_NC_1+C_1C_2+C_2C_3, +C_3C_4+\ldots+C_{N-1}C_N=N+(a_{i-1}-1)C_NC_1+\epsilon$$

where $\epsilon=C_1C_2+C_2C_3, +C_3C_4+\ldots+C_{N-1}C_N+C_NC_1=-1$ is the cyclic correlation of the PN code sequence with shift one. By carefully picking the code, we can make the product $C_NC_1=-1$. Hence the value of the integration is $N-a_{i-1}$, which equals to N−1 or N+1 depending on the previous bit value $a_{i-1}$.

When the bit −1 is transmitted, the current data value is $a_i=-1$, the previous data value is $a_{i-1}$. The received signal is $C_b=(C_1, -C_1, C_2, -C_2, C_3, -C_3, \ldots, C_N, -C_N)$, the delayed version of I is $I'=(a_{i-1}C_N, C_1, -C_1, C_2, -C_2, C_3, -C_3, \ldots, -C_{N-1}, C_N)$, The product of I with the delayed signal is $$V = (a_{i-1}C_NC_1, -C_1C_1, -C_1C_2, -C_2C_2, -C_2C_3, -C_3C_3,$$
$$-C_3C_4, \ldots, -C_{N-1}C_N, -C_NC_N)$$
$$= (a_{i-1}C_NC_1, -1, -C_1C_2, -1, -C_2C_3, -1, -C_3C_4, \ldots,$$
$$-C_NC_{N-1}, -1),$$

and the integration over one cycle gives $$-N+a_{i-1}C_NC_1-C_1C_2-C_2C_3, -C_3C_4--C_{N-1}C_N=-N+(a_{i-1}+1)C_NC_1-\epsilon,$$

where $\epsilon=C_1C_2+C_2C_3, +C_3C_4+\ldots+C_{N-1}C_N+C_NC_1=-1$ is the cyclic correlation of the PN code sequence with shift one. As discussed above, the product $C_NC_1=-1$. Hence the value of the integration is $-N-a_{i-1}$, which equals to −N−1 or −N+1 depending on the previous bit value $a_{i-1}$.

The value of N is large (typically 127), so the decision logic simply compares the integration value to zero. A positive value is interpreted as a +1 bit, while a negative value is interpreted as a −1 bit. Hence the signal has been decoded without the use of a correlation. Further, the differential decoding is performed chip-by-chip, so the receiver is very robust to drift in the carrier frequency. This further reduces cost by avoiding the need for a very accurate timer or clock source. For example, if the frequency difference between the transmitter and receiver is $\Delta\omega$, the receiver signal after demodulation is $$S(t)=A(t)\exp(-i\Delta\omega t+\partial),$$

where $\theta$ is a phase offset. The product signal is $$U(t)=S(t)\overline{S}(t-T_c)=A(t)A(t-T_c)\exp(-i\Delta\omega T_c),$$

and the real part is $$V(t)=A(t)A(t-T_c)\cos(\Delta\omega T_c).$$

Figure 4:
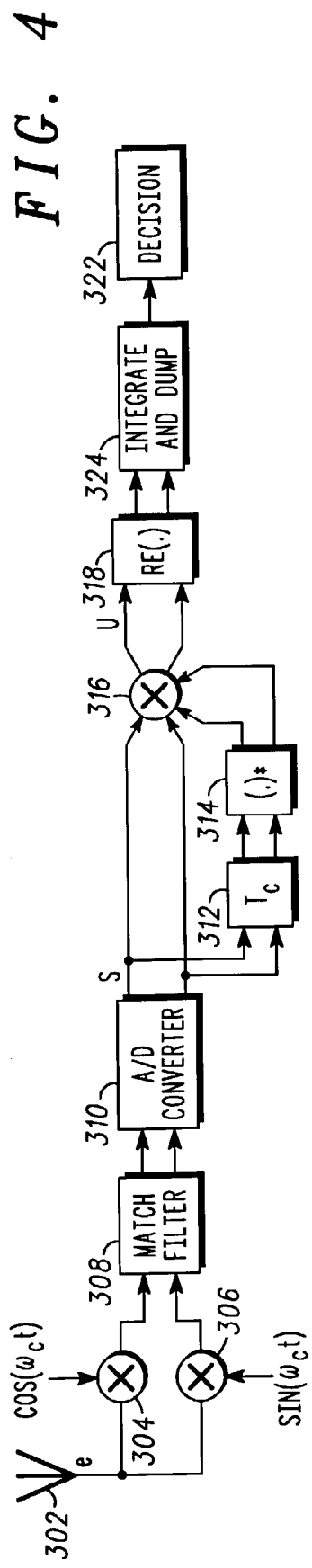
FIG. 4 is a diagrammatic representation of an analog receiver of the present invention.

Thus, when the product $\Delta\omega T_c$ is small, there is only a very small amplitude change. The computation can be performed using analog or digital hardware or using software running on a computer. FIG. 4 shows an embodiment of a receiver of the invention using an analog system. In this embodiment the ADC is omitted. The discrete integration element 320 in FIG. 3 is replaced by analog integrator 324 in FIG. 4. The integrator is periodically reset to zero.

Figure 5:
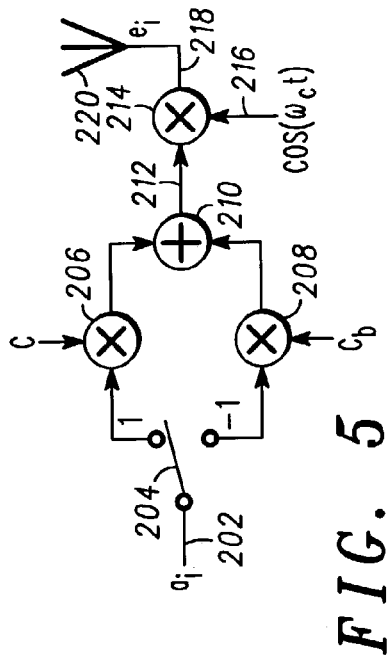
FIG. 5 is a diagrammatic representation of a transmitter of a further embodiment of the present invention.

A further embodiment of a transmitter is shown in FIG. 5. In this embodiment −1 bits are transmitted as before, but for +1 bits, the PN code sequence C is used rather than $C_a$. Since C is of length N while $C_a$ is of length 2N, the data rate of this embodiment is higher. The receiver is as described above.

When a bit 1 is transmitted, the received signal is $I=C=(C_1, C_2, C_3, \ldots, C_N)$, and the real part of the product with the delayed signal is $$V=(a_{i-1}C_NC_1, C_1C_2, C_2C_3, C_3C_4, \ldots, C_{N-1}C_N),$$

where $a_{i-1}$ is the previous bit data value.

The integration over one cycle gives $$C_1C_2+C_2C_3, +C_3C_4+\ldots+C_{N-1}C_N+a_{i-1}C_NC_1=\epsilon+(a_{i-1}-1)C_NC_1$$

where, as before, $\epsilon=C_1C_2+C_2C_3, +C_3C_4+\ldots+C_NC_{N-1}+C_NC_1=-1$ is the cyclic correlation of the PN code sequence with shift one. By carefully picking the code, we can make the product $C_NC_1=-1$. Hence the value of the integration is $-a_{i-1}$, which equals to −1 or +1 depending on the previous bit value $a_{i-1}$.

When the bit −1 is transmitted, the current data value is $a_i=-1$, the previous data value is $a_{i-1}$. The received signal is $C_b=(C_1, -C_1, C_2, -C_2, C_3, -C_3, \ldots, C_N, -C_N)$, the delayed version of I is $I'=(a_{i-1}C_N, C_1, -C_1, C_2, -C_2, C_3, -C_3, \ldots, -C_{N-1}, C_N)$, The product of I with the delayed signal is $$V = (a_{i-1}C_N C_1, -C_1 C_1, -C_1 C_2, -C_2 C_2, -C_2 C_3, -C_3 C_3,$$
$$-C_3 C_4, \ldots, -C_{N-1} C_N, -C_N C_N)$$
$$= (a_{i-1}C_N C_1, -1, -C_1 C_2, -1, -C_2 C_3, -1, -C_3 C_4, \ldots,$$
$$-C_N C_{N-1}, -1),$$

and the integration over one cycle gives $$-N + a_{i-1}C_N C_1 - C_1 C_2 - C_2 C_3 - C_3 C_4 -$$
$$-C_{N-1}C_N = -N + (a_{i-1}+1)C_N C_1 - \epsilon,$$

where $\epsilon = C_1 C_2 + C_2 C_3 + C_3 C_4 + \ldots + C_{N-1}C_N + C_N C_1 = -1$ is the cyclic correlation of the PN code sequence with shift one. As discussed above, the product $C_N C_1 = -1$. Hence the value of the integration is $-N - a_{i-1}$, which equals to $-N-1$ or $-N+1$ depending on the previous bit value $a_{i-1}$.

The value of N is large (typically 127), so the decision logic simply compares the integration value to $-N/2$. A value greater than $-N/2$ is interpreted as a +1 bit, while a value less than $-N/2$ is interpreted as a $-1$ bit. Hence the signal has been decoded without the use of a correlation.

The first embodiment has better sensitivity than this embodiment, i.e. it is less sensitive to noise, but this embodiment has a higher data rate.

Those of ordinary skill in the art will recognize that the present invention has been described in terms of exemplary embodiments based upon use of an ideal rectangular pulse. However, the invention should not be so limited, since the present invention could be implemented using other pulse shapes. Similarly, the present invention may be implemented using general-purpose computers, microprocessor based computers, digital signal processors, microcontrollers, dedicated processors, custom circuits, ASICS and/or dedicated hard-wired logic.

Many other variations will also be evident to those of ordinary skill in the art. The embodiment disclosed can be embodied in a DSSS receiver for a location system, for instance, but it is understood that the method and apparatus of the present invention is equally applicable to all other systems using DSSS techniques.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for generating a modulation sequence from a data value in a direct sequence spread spectrum transmitter, said method comprising:
    generating a first and second code sequences by interleaving groups of M chips from a pseudo-noise sequence $C=(C_1, C_2, C_3, \ldots, C_N)$ of length N with elements $C_i = \pm 1$, said first code sequence $C_a$ being $$C_a(2jM+i) = C(jM+i)$$

$$C_a((2j+1)M+i) = C(jM+i)$$

and said second code sequence $C_b$ being $$C_b(2jM+i) = C(jM+i)$$

$$C_b((2j+1)M+i) = -C(jM+i)$$

wherein $j=0, \ldots, N/M-1$ and $i=1, \ldots, M$, and M and N are integers; and
    selecting said modulation sequence as said first or second sequence according to the data value.

2. A method as in claim 1, wherein M=1, said first code sequence is given by $C_a = (C_1, C_1, C_2, C_2, C_3, C_3, \ldots, C_N, C_N)$ and said second code sequence is given by $C_b = (C_1, -C_1, C_2, -C_2, C_3, -C_3, \ldots, C_N, -C_N)$.

3. A method for generating a modulation sequence from a data value having a value $\pm 1$ in a direct sequence spread spectrum transmitter, said method comprising:
    generating a pseudo-noise sequence $C=(C_1, C_2, C_3, \ldots, C_N)$; wherein N is an integer;
    up-sampling the pseudo-noise sequence by a factor of two to obtain a first sequence $(C_1, 0, C_2, 0, C_3, 0, \ldots, 0, C_N, 0)$;
    delaying the first sequence to give a second sequence $(0, C_1, 0, C_2, 0, C_3, 0, \ldots, 0, C_N)$;
    multiplying said second sequence by the data value to obtain a third sequence; and
    adding said first and third sequences to obtain said modulation signal.

4. A method for generating a modulation sequence from a data value in a direct sequence spread spectrum transmitter, said method comprising:
    generating a pseudo-noise sequence $C=(C_1, C_2, C_3, \ldots, C_N)$ of length N, where $C_i = \pm 1$;
    generating an interleaved code sequence $C_b$ by interleaving groups of M chips from the pseudo-noise sequence C and the pseudo noise sequence $-C$ as $$C_b(2jM+i) = C(jM+i)$$

$$C_b((2j+1)M+i) = -C(jM+i),$$

wherein $j=0, \ldots, N/M-1$ and $i=1, \ldots, M$, and M and N are integers; and
    selecting said modulation sequence as said pseudo-noise sequence or C said interleaved sequence according to the data value.

5. A method as in claim 4, wherein M=1 and said interleaved code sequence is given by $C_b = (C_1, -C_1, C_2, -C_2, C_3, -C_3, \ldots, C_N, -C_N)$.

6. A direct sequence spread spectrum transmitter for generating a modulation sequence from a data value, the transmitter comprising:
    means for generating a first code sequence $C_a$ having elements $$C_a(2jM+i) = C(jM+i)$$

$$C_a((2j+1)M+i) = C(jM+i)$$

where $C=(C_1, C_2, C_3, \ldots, C_N)$ is a pseudo-noise sequence of length N with elements $C_i = \pm 1$, $j=0, \ldots, N/M-1$, $i=1, \ldots, M$ wherein M and M<N and M and N are integers;
    means for generating a second code sequence $C_b$ having elements $$C_b(2jM+i) = C(jM+i)$$

$$C_b((2j+1)M+i) = -C(jM+i);$$

means for selecting said modulation sequence as said first or second code sequence according to the data value.

7. A direct sequence spread spectrum transmitter as in claim 6, wherein M=1, $C_a = (C_1, C_1, C_2, C_2, C_3, C_3, \ldots, C_N, C_N)$ and $C_b = (C_1, -C_1, C_2, -C_2, C_3, -C_3, \ldots, C_N, -C_N)$.

8. A direct sequence spread spectrum transmitter for generating a modulation sequence from a data value having a value ±1, the transmitter comprising:
- a pseudo-noise generator for generating a sequence $C=(C_1, C_2, C_3, \ldots, C_N)$, where N is an integer;
- an up-sampler for up-sampling the pseudo-noise sequence by a factor of two to obtain a first sequence $(C_1, 0, C_2, 0, C_3, 0, \ldots 0, C_N, 0)$;
- a delay element for delaying the first sequence to give a second sequence $(0, C_1, 0, C_2, 0, C_3, 0, \ldots, 0, C_N)$;
- a multiplier for multiplying said second sequence by the data value to obtain a third sequence; and
- an adder for adding said first and third sequences to obtain said modulation signal.

9. A direct sequence spread spectrum transmitter for generating a modulation sequence from a data value, the transmitter comprising:
- a pseudo-noise generator for generating a pseudo-noise sequence $C=(C_1, C_2, C_3, \ldots, C_N)$ where $C_i = \pm 1$;
- means for generating an interleaved code sequence $C_b$ having elements $$C_b(2jM+i) = C(jM+i)$$

$$C_b((2j+1)M+i) = -C(jM+i);$$

where $C=(C_1, C_2, C_3, \ldots, C_N)$ is a pseudo-noise sequence of length N with elements $C_i = \pm 1$, $j=0, \ldots, N/M-1$, $i=1, \ldots, M$, wherein M<N, and M and N are integers; and
- means for selecting said modulation sequence as said pseudo-noise sequence or said interleaved sequence according to the data value.

10. A direct sequence spread spectrum transmitter as in claim 9, wherein M=1 and said interleaved code sequence is $C_b = (C_1, -C_1, C_2, -C_2, C_3, -C_3, \ldots, C_N, -C_N)$.

* * * * *